United States Patent [19]

Berry, Jr.

[11] 3,871,984

[45] Mar. 18, 1975

[54] TRANSMISSION OF POT LINE CONTROL SIGNALS

[75] Inventor: James Simmons Berry, Jr., Savannah, Tenn.

[73] Assignee: Reynolds Metals Company, Richmond, Va.

[22] Filed: Sept. 17, 1973

[21] Appl. No.: 398,287

[52] U.S. Cl. .................................. 204/228, 204/245

[51] Int. Cl. ............................ B01k 3/00, C22d 3/02

[58] Field of Search... 204/67, 225, 228, 243 R–247

[56] References Cited

UNITED STATES PATENTS

| | | | |
|---|---|---|---|
| 3,345,273 | 10/1967 | Brown | 204/67 X |
| 3,674,674 | 7/1972 | Arts et al. | 204/228 X |
| 3,761,379 | 9/1973 | Elliot | 204/228 X |

FOREIGN PATENTS OR APPLICATIONS

| | | | |
|---|---|---|---|
| 188,678 | 3/1967 | U.S.S.R. | 204/67 |

*Primary Examiner*—John H. Mack
*Assistant Examiner*—D. R. Valentine
*Attorney, Agent, or Firm*—Glenn, Palmer, Lyne & Gibbs

[57] ABSTRACT

A digital data processor controls a plurality of alumina reduction cells through a plurality of multiplexer circuits. Each cell is connected through a multiplexer to a section box. One section box is provided for each pot line and all signals passing between the cells of a pot line and the processor pass through the section box. An addressable multiplexer is provided for each cell and all multiplexers for a given pot line are connected in parallel. Commands from the data processor are supplied to an addressed multiplexer to control cell operations such as moving the anode bridge, feeding in more alumina, and breaking the cell crust. Other commands cause the stem voltage for any designated anode of an addressed cell, or the cell voltage for an addressed cell to be read out to the processor. Each section box includes a ground detector circuit. Anode stem voltages read from any anode of any cell on a pot line may be applied to the ground detector circuit for the purpose of detecting a grounded or an incipiently grounded anode.

14 Claims, 9 Drawing Figures

TRANSMISSION OF POT LINE CONTROL SIGNALS

SUMMARY OF THE INVENTION

The application of Richards and Berry, Ser. No. 398,286, filed concurrently herewith, discloses and claims a novel method and apparatus for detecting and identifying grounded or incipiently grounded anodes in an alumina reduction cell. As disclosed therein, a single pot line may include as many as thirty cells and, typically, each cell may have 18 anodes. Thus, if each anode is provided with its own ground detector circuit 540 such circuits would be required for one pot line.

An object of the present invention is to provide a multiplexer system whereby a single ground detector circuit may be employed to detect the grounded or ungrounded condition of any anode of any cell on a pot line.

An object of the present invention is to provide a single addressable section box and a plurality of multiplexers, one for each cell, said section box and multiplexers being operable in response to address and function codes for controlling various operations at the cell, and providing to the data processor data regarding the operating conditions of the cell.

An object of the present invention is to provide a system for controlling a plurality of alumina reduction cells each including a plurality of anodes, the system including a data processor means for issuing address and function codes, sensor means for sensing the stem voltage of each anode in each cell, ground detector means, and a plurality of addressable multiplexers, one for each cell and including means responsive to address and function codes from the data processor for selectively connecting one of the sensor means to the ground detector means.

A further object of the invention is to provide a system for controlling a plurality of alumina reduction cells each including one section box for an entire pot line, and a multiplexer for each cell, the multiplexers being individually addressable and responsive to function codes from a data processor for controlling various functions at the cell and sensing various conditions of the cell. All multiplexers are connected in parallel to a data bus, and are further connected in parallel to a ground detector bus, the ground detector bus being connected to a ground detector means in the section box. The section box is addressable and includes switching means for selectively applying the output of the ground detector means, or the signal on the data bus, to the data processor.

A feature of the invention is the provision of means in each multiplexer for generating an error signal if the multiplexer is not addressed a second time after it is addressed a first time.

A further feature of the invention is the provision of means in each multiplexer for generating an error signal if the voltage across a cell should exceed a predetermined limit.

Other objects and features of the invention will become apparent upon consideration of the following description and accompanying drawings.

DESCRIPTION OF A PREFERRED EMBODIMENT

The Reduction Cell

Figure 1:
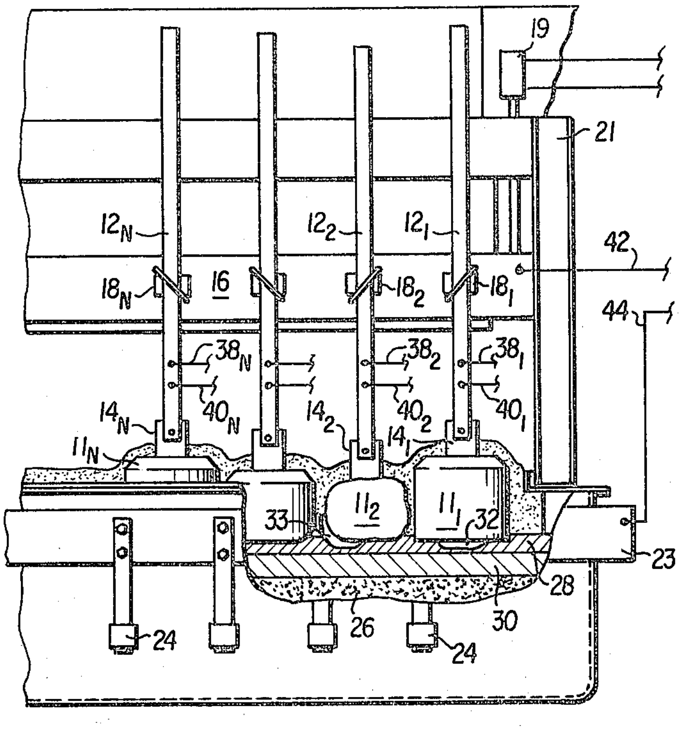
FIG. 1 is a side view, partly in section, showing a prior art multiple anode alumina reduction cell.

For purposes of illustrating the invention, FIG. 1 shows a prior art alumina reduction cell of a type known by various names such as "prebake", "Niagara," etc. However, it will become clear from the following description that the present invention is not limited in use to cells of the type illustrated in FIG. 1. As shown in FIG. 1, the cell includes a plurality, i.e., N carbon block anodes 11 each connected to a copper anode rod or stem 12 by means of a metal stub 14 cast in the carbon anode block. Each rod 12 is clamped to an anode bus 16 by means of a hand-operated clamp 18. The clamps permit an operator, with the aid of a conventional hand jack generally used in the industry, to raise or lower one anode block 11 relative to the others. A motor driven bridge jack 19, attached to a cell frame 21, drives the anode bus 12 so that all of the anode blocks maybe raised or lowered in unison.

A low voltage, high current source (not shown) has its positive side connected to the anode bus 16 and its negative side connected to a cathode bus 23. The cathode bus is connected by means of current collectors 24 to a carbon cathode 26. During operation of the cell each carbon block 11 is maintained with its lower surface in contact with a layer of molten cryolite 28. As the reduction process takes place, a layer of molten aluminum 30 forms adjacent the cathode 26 while oxygen combines with the carbon blocks 11 to form gas bubbles (oxides of carbon) at the lower faces of the carbon blocks. FIG. 1 shows one gas bubble 32 as it is being formed at the lower face of the right-most carbon block $\mathbf{11_1}$. Depending upon the hydrostatic pressure at the lower face of each carbon block, the bubbles build up to a certain size (with limits) before they escape around the carbon blocks to the upper surface of the cell. A gas bubble 33 is shown as it is released from the lower surface of a carbon block and begins movement into the atmosphere above the cell. In the following description a carbon block 11 is referred to simply as an anode.

Each anode stem 12 has an anode current measuring means connected thereto for deriving a voltage proportional to the current flowing through the stem. This current measuring means comprises two electrical leads 38 and 40 connected at separate points along the stem. Because of the electrical resistance of the anode stem to current flowing therethrough, a voltage differential, sometimes referred to as the stem voltage, exists between the two points on the stem and this voltage appears on the leads 38 and 40. This method of measuring anode current flow is well known in the art.

It has been found that as long as a particular anode 11 is properly adjusted, then for a given current through the anode, gas bubbles 32 are formed and released at a fairly constant rate. As each bubble increases in size it decreases the area of contact between the lower surface of the anode 11 and the layer of molten cryolite 28. This in effect causes a gradual increase in the anode resistance and results in a corresponding decrease in current through the anode. As each bubble is released, the area of contact between the anode and the cryolite again increases with the result that the current through the anode again increases. Thus, during normal cell operation the stem voltage appearing across leads 38 and 40 is a DC voltage that fluctuates slowly in a generally sinusoidal fashion at a frequency corresponding to the frequency at which bubbles are formed and released at the anode.

When an anode 11 is grounded to the layer of molten aluminum 30, or is maladjusted to such an extent that it is incipiently grounded, a conductive current path is established from anode bus 16, through anode stem 12, anode 11, aluminum layer 30, and current conductors 24, to the cathode bus 23. This conductive current is wasted and contributes nothing to the reduction process. Since the conductive current does not contribute to the reduction process, fewer gas bubbles 32 are formed at the anode 11 for a given current through the anode. As a result, for a given anode current, the stem voltage across leads 38 and 40 fluctuates at a lower frequency when the anode is grounded or maladjusted than when it is in normal operating condition.

From the above description it is seen that the presence of a grounded anode, an incipiently grounded anode, or an anode in need of vertical adjustment with respect to the liquid cathode, may be detected by a method including the steps of determining the frequency of the voltage fluctuations appearing across leads 38 and 40 and comparing this frequency with what the normal frequency of the fluctuations should be for the amount of current flowing through the anode. When the anode is grounded or is vertically maladjusted so that there is an electronic conduction path from the anode to the liquid cathode, the frequency is significantly less for a given current flow than for normal or ungrounded anode operation with the same current flow.

Since the frequency of fluctuations for a given current flow through an anode is dependent on the particular cell, it is necessary to establish the normal relationship between electrolytic current flow and the frequency of the fluctuations resulting from gas bubble release. This is accomplished by properly adjusting the anodes of a cell, varying the current through the anodes, and plotting a graph of total (individual) anode currents against the frequency or period between fluctuations.

Figure 7:
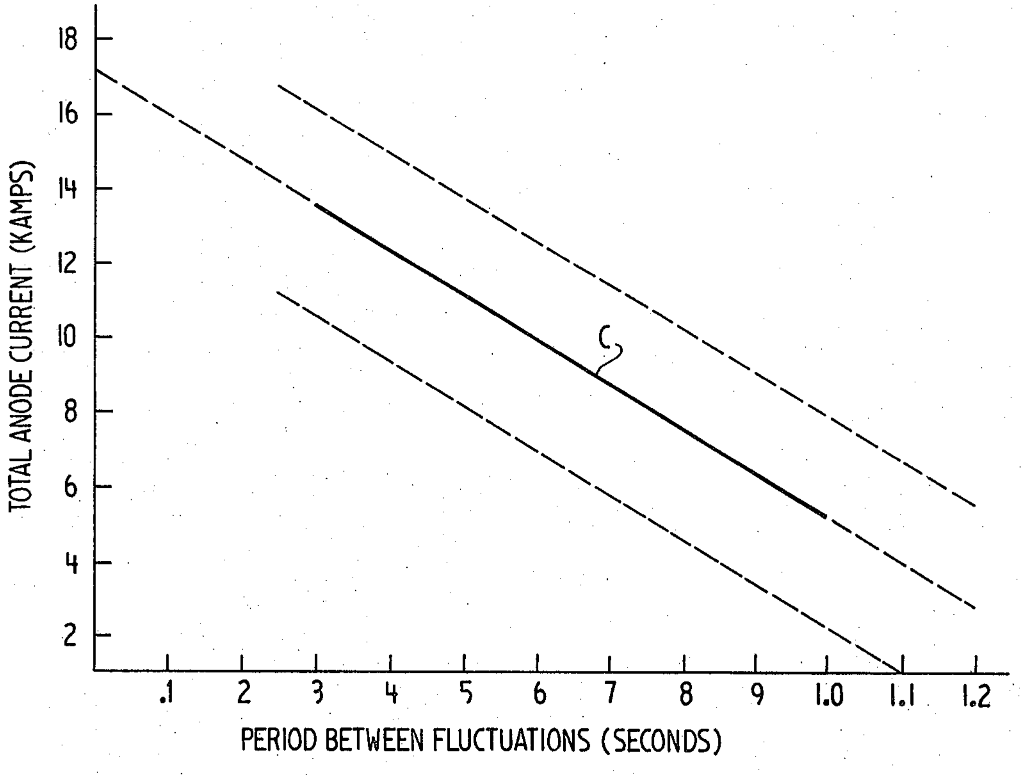

FIG. 7 is a graph of total anode current versus the period between fluctuations due to gas bubble release for an anode of a typical cell. The graph is obtained by applying anode stem voltages, one at a time to a conventional X-Y plotter and recording the fluctuations as a function of time. By visual analysis, i.e. by counting the peaks of the generally sinusoidal trace over an interval of time, the period between fluctuations for that particular anode current is determined. This fixes one point on the graph of FIG. 7. The anode current is then changed and the process repeated to determine another point on the graph. To obtain the graph of FIG. 7, the anode current was varied in steps between about 13,750 amps and 5,500 amps and a point on the graph established for each step. The data for the graph of FIG. 7 was obtained over a five day period with measurements being made each day on from 2 to 12 anodes in an 18 anode cell. However, the measurements need not be made over such a long interval of time.

It will be understood that because of various factors occurring during the measurement, and the error inherent in measurements of the type described above, all of the computed points on the graph of FIG. 7 do not fall on a straight line. Thus, the line C represents the curve of best fit for the points plotted. All of the measurements resulted in plotting points falling within the 95 percent confidence limits represented by the dashed lines of FIG. 7. With the method described above, it was found that the period for a given anode current was reproducible within ±0.03 seconds.

The normal relationship between electrolytic current flowing through an anode, and the period between fluctions is represented by the equation $$I_E = Y - (dy)/(dx)\cdot T$$

where $I_E$ is the electrolytic current flowing through the cell, $Y$ is the intercept obtained by extrapolating the curve C of FIG. 7, $dy/dx$ is the slope of the curve C, and $T$ is the time in seconds between fluctuations. Having once established this normal relationship for a properly adjusted cell, measurements may later be made while the cell is in operation to determine which, if any, of its anodes are grounded or improperly adjusted.

Typical Examples

The following examples illustrate how the above-described method may be used for the analysis of anode adjustment. All examples are for a reduction furnace having 18 prebaked anodes.

EXAMPLE I

A manual analysis was made by recording anode stem voltages proportional to current for an interval of 30 to 40 seconds. From analysis of the recordings for all eighteen anodes it was established, as explained above with respect to FIG. 7, that the period between successively released gas bubbles should be between 0.4 and 0.6 seconds for an anode carrying 12,000 amps. One anode carrying 12,000 amps showed a periodicity in the sinusoidal waveform of between 1.10 and 1.25 seconds. Partial electronic conduction was suspected. When the anode was removed for inspection it was found to have a projection.

The grounded anode was raised two inches. With the anode current at 7,300 amps the period of bubble release was redetermined and found to be 0.95±0.5 sec. From the normal relationship between current and period established by measurement of all the anode currents, the period should have been 0.86±.12 sec. This indicated that the anode was no longer grounded. A physical check of the anode confirmed that the projection was no longer contacting the metal pad.

EXAMPLE II

In this example, the anode stem voltages were sensed for about 30 seconds each applied to the filter circuit of FIG. 3, described below, and the filtered signals applied to the X-Y plotter. Determination of the period between fluctuations was made manually by counting the number of fluctuations per unit of time on the recorded trace.

The normal relationship was determined to be $I_E = 14,600 - 6,150T$.

Upon subsequent measurement it was found that one anode carrying 8,800 amps was releasing gas bubbles every 1.40 seconds. This was three standard deviations from the normal relationship and the anode was diagnosed as grounded. Upon removal for inspection it was found to have a projection into the metal pad.

EXAMPLE III

In this example, the measurements were made as in Example II, but with the differential amplifier 208 (FIG. 2) connected to the input of the filter circuit.

The normal relationship was determined from readings on 15 anodes to be $I_E = 16,000 - 7,700T$.

Upon subsequent measurement, one anode carrying 15,200 amps was releasing a gas bubble about every 0.77 second, and one anode carrying 10,700 amps was releasing a gas bubble every 1 second. These points were 3 and 7 standard deviations, respectively, outside the zone of reasonable error in the normal relationship. The anodes were predicted to be grounded. When raised for inspection, the first anode was found to have a white hot projection six inches in diameter, and the latter anode was found to have a projection 1.5 inches in diameter.

EXAMPLE IV

By the manual method of Example I, two anodes were determined to be properly adjusted and carrying 11,300 and 8,400 amps. The fluctuations were determined to be occuring at intervals of 0.66 and 1.02 seconds, respectively.

Figure 2:
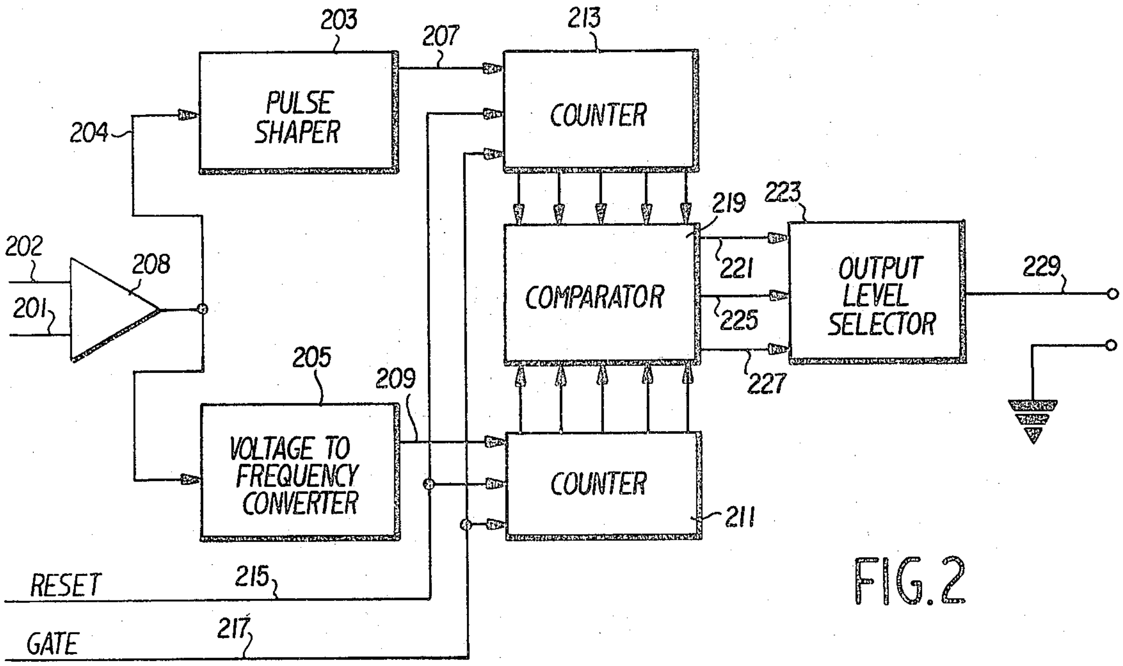
FIG. 2 is a block diagram of a circuit for detecting a grounded or maladjusted anode.

Another measurement was then made at the same anode current levels using the amplifier 208, filter-shaper 203, and counter 213 of FIG. 2. This measurement determined the period between fluctuations for the two anodes to be 0.72 and 1.0 seconds, respectively, thus indicating the operativeness of the electronic apparatus for making the measurements.

GROUND DETECTOR CIRCUITS

While referred to as ground detector circuits, it will be evident that the circuits subsequently described may be employed to detect a grounded anode, an incipiently grouunded anode, or, in general in electronic conductive path between an anode and the liquid cathode in a reduction cell. In a Niagra aluminum reduction cell with an anode in need of vertical adjustment, the measured rate of stem voltage fluctuation will vary 0.8 to 1.2 standard deviations from the normal relationship between anode current and voltage fluctuation.

FIG. 2 is a block diagram of a preferred embodiment of an apparatus for detecting grounded anodes in accordance with the method described above. As subsequently explained, the stem voltage signals appearing across leads 38 and 40 are multiplexed so that they are applied one at a time to the input leads 201 and 202 of FIG. 2. However, for purposes of the present description, assume that the leads $\mathbf{38_1}$ and $\mathbf{40_1}$ of FIG. 1 are directly connected to the leads 201 and 202 respectively. Thus, the stem voltage representing current flow through the right-most anode $\mathbf{11_1}$ (FIG. 1) is applied over leads 201 and 202 to a differential amplifier 208. The output of amplifier 208 is connected to the inputs of a pulse shaper 203 and a voltage-to-frequency converter 205.

Pulse shaper 203 is subsequently described in detail but, generally speaking, it filters out noise from the incoming signal and produces an output lead 207 a sequence of pulses with each pulse corresponding to the formation and release of one gas bubble at the right-most anode $\mathbf{11_1}$. The output pulses from pulse shaper 203 are applied over the lead 207 to a counter 213 which accumulates a count representing the actual number of bubbles released during a given interval.

The voltage-to-frequency converter 205 is designed such that over a given interval of time it produces on an output lead 209 a number of pulses corresponding to the number of gas bubbles which should be formed and released at an anode 11, if the anode is not grounded. Thus, the conversion ratio may vary depending upon the type of cell being monitored, and should be adjusted accordingly when the ground detector apparatus is first set up. The pulse on lead 209 are applied to a counter 211 to provide a digital standard of bubble count against which the actual bubble count may be compared.

The circuit of FIG. 2 operates as follows. A reset pulse is applied over a lead 215 to reset both the counters 211 and 213. After termination of the reset pulse a gating pulse is applied to both of the counters over a lead 217. This pulse may last for a considerable length of time, say 30 seconds, and during this 30 second interval conditions both counters 211 and 213 to receive the pulses applied to them over leads 209 and 207, respectively. At the end of the 30 second interval the gate pulse on lead 217 is terminated. At this time the counter 211 contains a count corresponding to the number of bubbles which should have been released from underneath the anode $\mathbf{11_1}$ during the 30 second interval, and the counter 213 contains a count of the number of bubbles actually released during that interval. The outputs from counters 211 and 213 are applied to a digital comparator 219 which compares the two counts and determines whether they are equal or one is greater than the other. If the count in counter 213 is less than the count in counter 211, comparator 219 produces a signal on lead 221 to condition an output level selector 223. If the count in counter 211 is equal to or greater than the counter 213 then the comparator 219 produces a signal on lead 225 or 227, respectively, to condition the output level selector.

The output level selector 223 comprises a conventional gating means for gating onto an output lead 229 one of three voltage levels, −5V, 0V, or +5V, depending upon whether the selector is conditioned by a signal on lead 221, 225 or 227, respectively.

In the simplest form of the invention, the voltage on lead 229 might be used to visually or audibly signal to an operator the grounded condition of the anode. However, as subsequently explained, the output voltage levels on lead 229 are fed to a data processor which controls a plurality of groups of cells each having a plurality of anodes 11, and the data processor uses the signals to monitor and control various operations associated with the cell.

Figure 3:
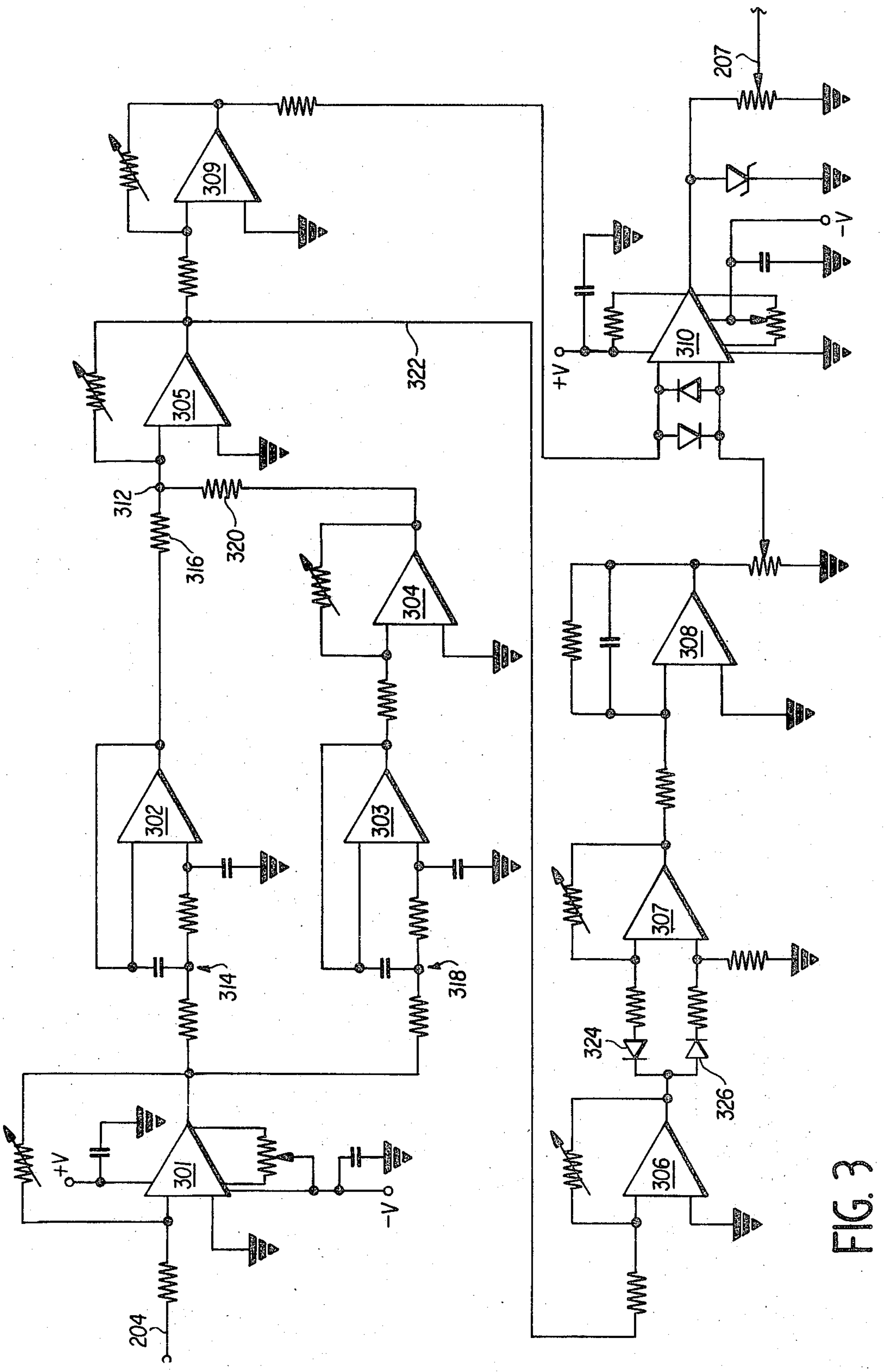
FIG. 3 is a schematic wiring diagram of a pulse shaper such as that used in FIG. 2.

Details of the pulse shaper 203 are shown in FIG. 3 The purpose of the pulse shaper is to filter out of the signal representing anode current all of those fluctuations falling outside of the range at which fluctuations, resulting from the formation and release of gas bubbles, occur. The particular rate of bubble formation and release varies according to the type of cell, anode current, etc, but the rate is generally on the order of 0.3–5.0 bubbles per second. Fluctuations above or below the frequency of interest may result from electrical motors and other electrical apparatus found in the vicinity of the cell.

The pulse shaper comprises integrated circuits 301 through 310. Circuits 301 through 309 are micro-operational amplifiers, for example Fairchild Type 741C, whereas circuit 310 may be a type 351K analog comparator such as that commercially available from analog Devices, Inc. For the sake of clarity, the bias voltages and external connections for amplifiers 302 through 309 are not shown but it should be understood that they are the same as those shown for amplifier 301.

The voltage signal representing anode current is applied over lead 204 to amplifier 301 which functions merely as a scaling amplifier. The output of amplifier 301 is applied to a notch filter means comprising amplifiers 302, 303, 304 and summing junction 312. More specifically, the output of amplifier 301 is applied to amplifier 302 through a filter circuit, generally indicated at 314, so that the output of amplifier 302 includes signals of all frequencies less than the maximum frequency at which bubbles are produced and released. The output of amplifier 302 is applied to the summing junction 312 through a resistor 316.

The output of amplifier 301 is also connected through a filter circuit, generally designated 318, to the input of amplifier 303. The filter circuit 318 is such that the output of amplifier 303 is a signal containing only frequencies less than the minimum frequency at which bubbles are produced and released. The output signal from amplifier 303 is inverted by amplifier 304 and applied to summing junction 312, so that the input to scaling amplifier 305 is a signal comprising pulses or amplitude variations occurring at frequencies within the range of frequencies at which bubbles are produced and released. These pulses are amplified by amplifier 309 and applied to one input of the comparator 310. In some cases it is possible to dispense with scaling amplifier 309 and apply the output of amplifier 305 directly to the comparator.

The pulses appearing at the output amplifier 305 are in the nature of half sine waves centered about a zero voltage level. The pulses are also applied over a lead 322 to the amplifier 306 and the output of this amplifier is connected through a pair of diodes 324 and 326 to the amplifier 307. Amplifier 306 and 307 together with the diodes 324 and 326 provide full wave rectification and amplification of the output signal from amplifier 305. The output of amplifier 307 is then applied to amplifier 308 which functions as a slow filter or integrator. As a result, the output of amplifier 308 is a DC signal equal to the average value of the peaks of the pulses produced at the output of amplifier 205. The output of amplifier 308 is applied to the second input of comparator 310 so that the comparator produces a digital output pulse on lead 207 only for those intervals of time during which the output pulses from amplifier 305 exceed in magnitude the DC average of the pulses. This has the effect of eliminating noise pulses or pulses of small magnitude which might result from conditions other than the formation and release of gas bubbles at the anode. The shaped pulses on lead 207 are then applied to counter 213 as previously described.

MULTIPLEXER SYSTEM

As previously explained, ground detector circuits such as those shown in FIGS. 2 and 3 might be provided for each anode in each cell in order to monitor operations of the cells and detect grounded anodes. However, in a typical reduction plant there may be, for example, three pot lines each comprising 30 pots or cells, with each cell having 18 carbon anode blocks. This means that for the entire system 1,620 circuits like those shown in FIGS. 2 and 3 would be required. In accordance with one aspect of the invention, multiplexing means are provided for selectively connecting the voltages read at the anode stems 12 to a ground detector so that one ground detector may perform the detection function for all of the anodes in all of the cells of one pot line. Thus, for the assumed system configuration only 3, rather than 1,620 ground detector circuits would be required. The invention in its application is not limited to a system having the specific number of pot lines, cells per pot line, or anode blocks per cell, as assumed, but may be used in a system having more or fewer of any or all of these elements.

Figure 4:
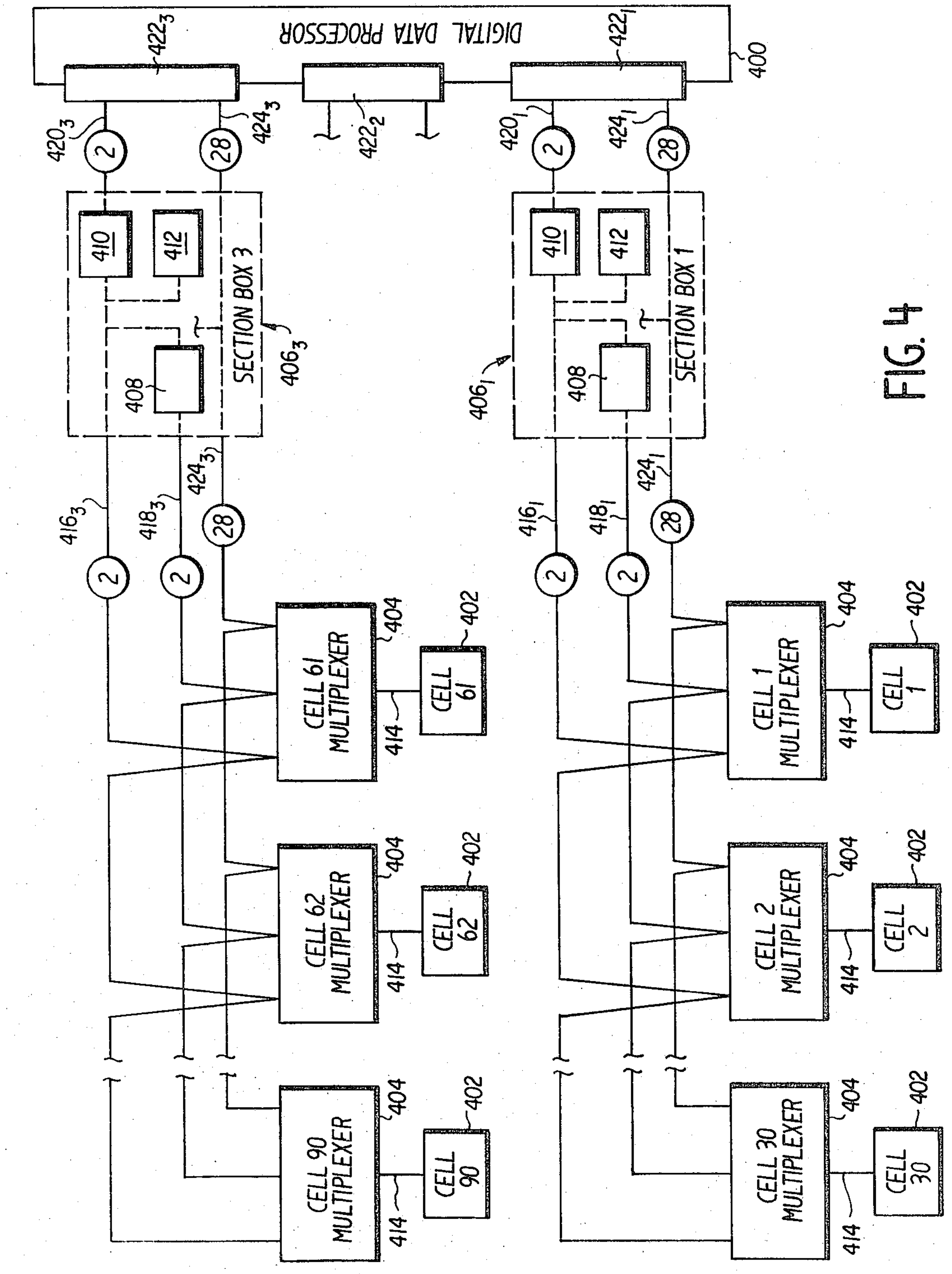
FIG. 4 is a block diagram of a data processor and multiplexer system for controlling a plurality of pot lines.

FIG. 4 is a block diagram of the multiplexer system. A digital data processor 400 controls three pot lines (only two of which are shown) with each pot line including 30 pots or alumina reduction cells 402. A cell multiplexer 404 is provided for each cell and a single section box 406 is provided for each pot line. Each section box includes one ground detector 408, an isolator 410, and a calibrating power supply 412.

As subsequently explained in greater detail, data read from a cell 402 is transferred over a bus 414 to its associated multiplexed 404 and control signals from the data processor are passed through the multiplexer and the bus 414 to perform various control functions in the cell. All of the multiplexers for one pot line are connected in parallel to a data bus 416 and this data bus is connected to the section box 406. The cell multiplexers for a given pot line are also connected in parallel to a ground detector bus 418 and this bus is connected to the ground detector 408 in the section box. The output from the ground detector 408 is tied to the data bus 416 so that either the data on bus 416 or the output of the ground detector 408 may pass through the isolator 410 and over a connecting data bus 420 to the computer interface circuits 422. Each of the cell multiplexers 404 is also connected in parallel to a control bus 424 which extends through the section box 406 to the computer interface circuits 422. As subsequently explained, certain leads within control bus 424 are also connected to circuits within the section box 406.

The control bus 424 contains 28 pairs of leads. One pair of leads is for transmitting one binary bit representing an interrupt signal from the cell multiplexers to the data processor. The remaining thirteen pairs of leads are for transmitting a thirteen bit command or control word containing address, function, and control signals from the data processor to the multiplexers and section box. Within the bus 424 are five pairs of address lines which enable the data processor to address either the section box 406 for a pot line or any one of the cell multiplexers in the pot line. It should be noted that with only five pairs of address lines it is possible to address only 31 addresses. Thus, five pairs of address lines permits the addressing of 30 multiplexers and the section box for each pot line. The selection of the pot line is determined by the program of the data processor which determines which of the interface circuits 422 will be enabled to pass the address signals. For example, if the data processor is working the portion of the program dealing with pot line 1, and the binary address 00001 is generated, this address would pass through interface circuits $\mathbf{422}_1$ and select the multiplexer 404 for cell 1 in the first pot line. On the other hand, if the data processor is working that section on the program relating to the third pot line, and generates the address 00001, then this address would pass through interface circuits $\mathbf{422}_3$ to select the multiplexer 404 for cell 61.

SECTION BOX

Figure 5:
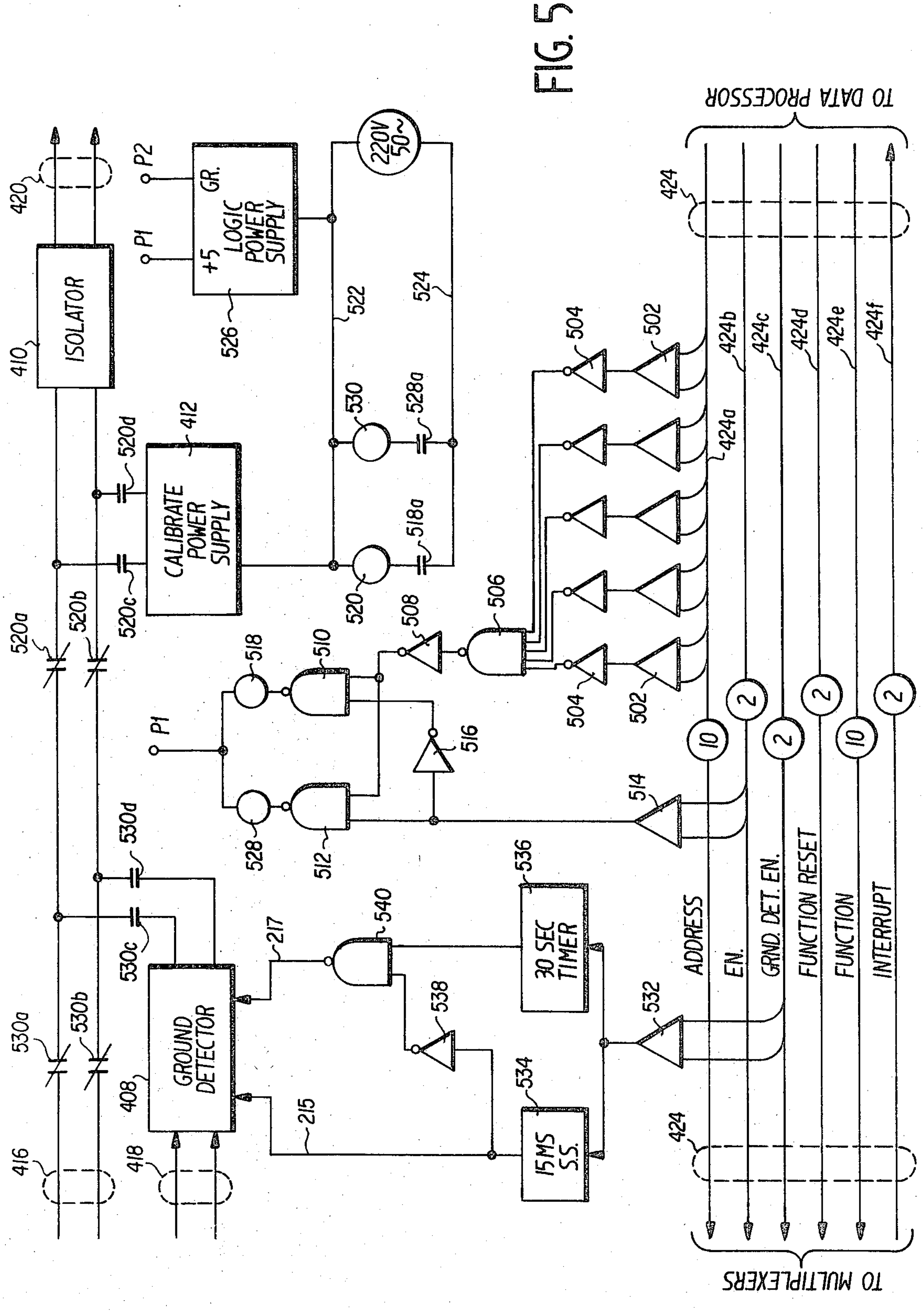
FIG. 5 is a logic diagram of the circuits employed in the section box associated with one pot line.

The section boxes 496 are all identical and the details of a typical section box are shown in FIG. 5. In the lower portion of this FIG. the control bus 424 is shown as several busses depending upon the functions performed by the signals appearing on the leads. The bus 424*d* includes two leads for carrying a Function Reset signal, the bus 424*e* includes ten leads for carrying the five digit binary code representing the function to be performed, and the bus 424*f* includes two leads for carrying an Interrupt signal. These leads merely pass through the section box on their way between the multiplexers and the data processor and are not connected to any of the circuits in the section box.

The control bus also includes an address bus 424*a* having ten leads for carrying signals representing a 5-bit binary address, a bus 424*b* having two leads for carrying an Enable signal, and a bus 424*c* having two leads for carrying a Ground Detection Enable signal. At this point it should be noted that in the present system a pair of leads is required to transmit a signal representing a binary bit. A binary 1 is represented by a high level voltage signal on one lead concurrently with a low level voltage on the second lead of the pair. A binary 0 is represented by a low level signal on the first lead of a pair concurrently with a high level signal on the second lead.

Each section box is assigned the address 31. Five differential receivers 502 are connected to the five pairs of address lines in the control bus 424*a* and when the address 31 appears on the control bus all five differential receivers produce a low level output signal. The differential receivers are operational amplifiers connected in a comparator configuration. The output of each differential receiver is connected through an inverter 504 to an input of a NAND gate 506. When the address 31 is present on the control bus NAND 506 produces a low level output signal that is inverted by an inverter 508 and applied to one input of two NAND gates 510 and 512. A differential receiver 514 has its inputs connected to the pair of leads in the control bus 424*b* which carries the Enable signal. When the signal on these leads specifies Enable the differential receiver 514 produces a low level output signal that disables NAND 512. At the same time, the output from the differential receiver is inverted by an inverter 516 to condition the second input of NAND 510. The NAND gate produces an output signal to energize a solid state relay 518. As used herein, a solid state relay may be a transistor or any combination of transistors for performing a specified switching function. For an easy understanding of the present description, a solid state relay is treated as through it were an electro-mechanical relay, and is illustrated as such in the drawings.

The relay 518 has a set of normally open relay contacts 518*a* connected in series with a solid state relay 520 across the power supply lines 522 and 524. When the contacts 518*a* close the relay 520 is energized to open normally closed contacts 520*a* and 520*b* and close normally open contacts 520*c* and 520*d*. The opening of contacts 520*a* and 520*b* disconnects the data bus 416 and the output of ground detector 408 from the input to isolator 410 while the closing of contacts 520*c* and 520*d* connects the output of calibrate power supply 412 to the input of the isolator.

The section box is provided with two power supplies. The logic power supply 526 provides the power for operating the various logic circuits in the section box. The calibrate power supply 412 is a highly regulated power supply which is used for checking the isolator 410. By applying a control word containing address 31 and an Enable bit to the section box in the manner just explained, the calibrate powder supply may be connected to the isolator to apply a known voltage level to the input of the isolator. The output of the isolator is transmitted to the data processor over the bus 420 and from the value of the voltage received at the data processor it may determine if the isolator 410 is functioning properly. When the control word on control bus 424 is terminated the circuits for connecting the calibrate power supply to the isolator return to normal.

The section box is also addressed to read out to the data processor the output from the ground detector 408. The command, Read Ground Detector includes the address 31 with no Enable bit. The address 31 again causes the output of NAND 506 to condition one input of NAND gates 510 and 512. However, in the absence of an Enable bit the differential receiver 514 produces a high level output signal. This signal conditions the second input of NAND 512 at the same time that the signal is inverted at 516 to block NAND gate 510. NAND 512 produces a low level output signal to energize a solid state relay 528. Relay 528 has a set of normally open contacts 528*a* connected in series with a further solid state relay 530 across the power supply lines 522 and 524. When relay 530 is energized it opens normally closed contacts 530*a* and 530*b* and closes contacts 530*c* and 530*d*. This disconnects the data bus 416 from isolator 410 and connects the output of the ground detector 408 to the isolator so that the output from the ground detector may pass through the isolator and over bus 420 to the data processor.

As soon as the command Read Ground Detector is terminated on the control bus, the output from NAND 506 disables NAND 512 and the circuits for reading out the output from the ground detector all return to normal.

As explained with reference to FIG. 2, the counters in the ground detector must be reset at the beginning of the measuring intervals and then the inputs of the counters must be enabled over a period of time to enable the counters to accumulate a count. The circuits for generating the counter reset pulse and the counter gating pulse are shown in FIG. 5. As subsequently explained, the command Determine Status enables the stem voltage drop at one anode of one cell on the pot line to be applied over bus 418 to the ground detector 408 for that pot line. The command Determine Status comprises the Ground Detector Enable bit with an address specifying the multiplexer controlling the cell anode whose status is to be determined. Two leads in the control bus 424*c* carry the voltage levels representing the Ground Detection Enable bit. This bit is applied to a differential receiver 532 and the output of the receiver 532 drops to a low level at the time a measuring interval is to begin. The output of differential receiver 532 triggers a 15 millisecond single shot multivibrator 534 and a 30 second timer 536. For a period of 15 milliseconds the multivibrator 534 applies a signal over the lead 215 to the ground detector to reset the counters in the ground detector. During this 15 millisecond interval the output of multivibrator 524 is inverted by an inverter 538 to block one input of a NAND gate 540. The NAND gate 540 has a second input that is conditioned by the output of the 30 second timer 536 as soon as the timer is triggered. At the end of the 15 millisecond reset interval the output of amplifier 538 goes to a high level to condition NAND 540. The output of NAND 540 is applied over lead 217 to the gating inputs of the counters in the ground detector 408. At the end of the 30 second interval the output of the timer 536 drops to a low level thus blocking NAND 540 and terminating the gating pulse.

MULTIPLEXER

Addressing and Function Decoding

Figure 6A:
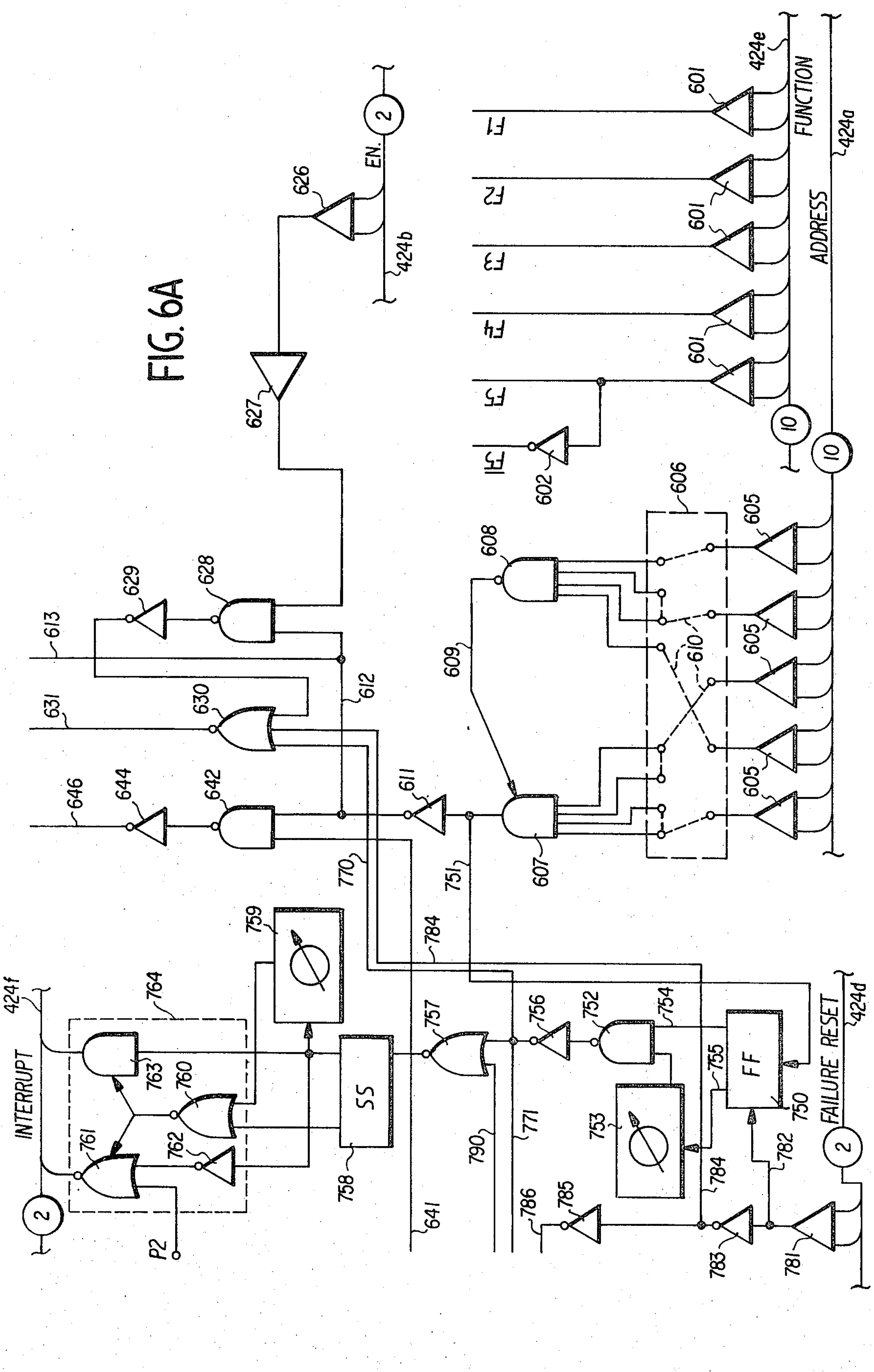
FIGS. 6A-6C are logic diagrams showing the circuits of a multiplexer for controlling one reduction cell; and, FIG. 7 is a graph showing the relationship between anode current and fluctuations in anode voltage for a typical adjusted cell.
Figure 6B:
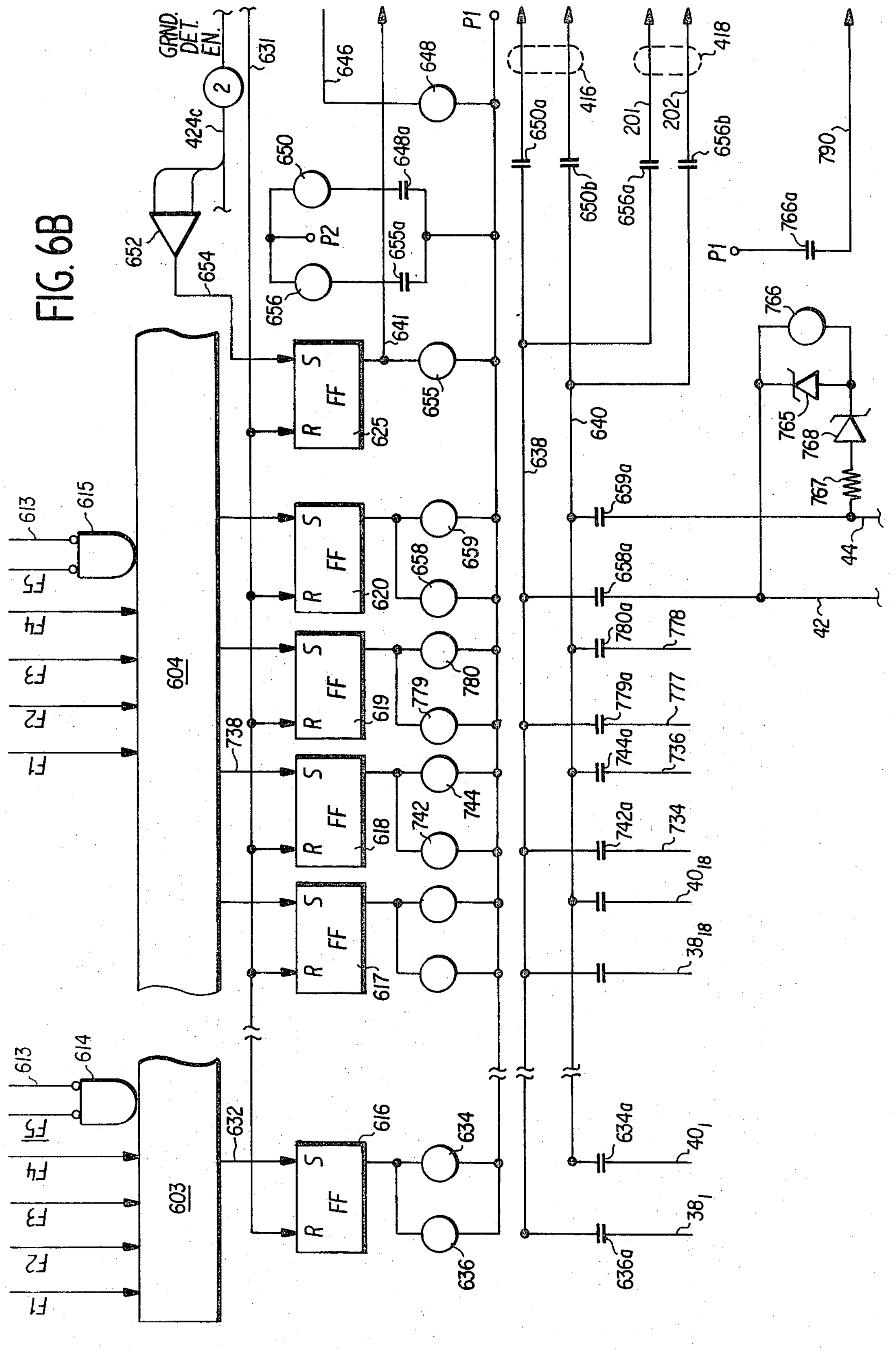
Figure 6C:
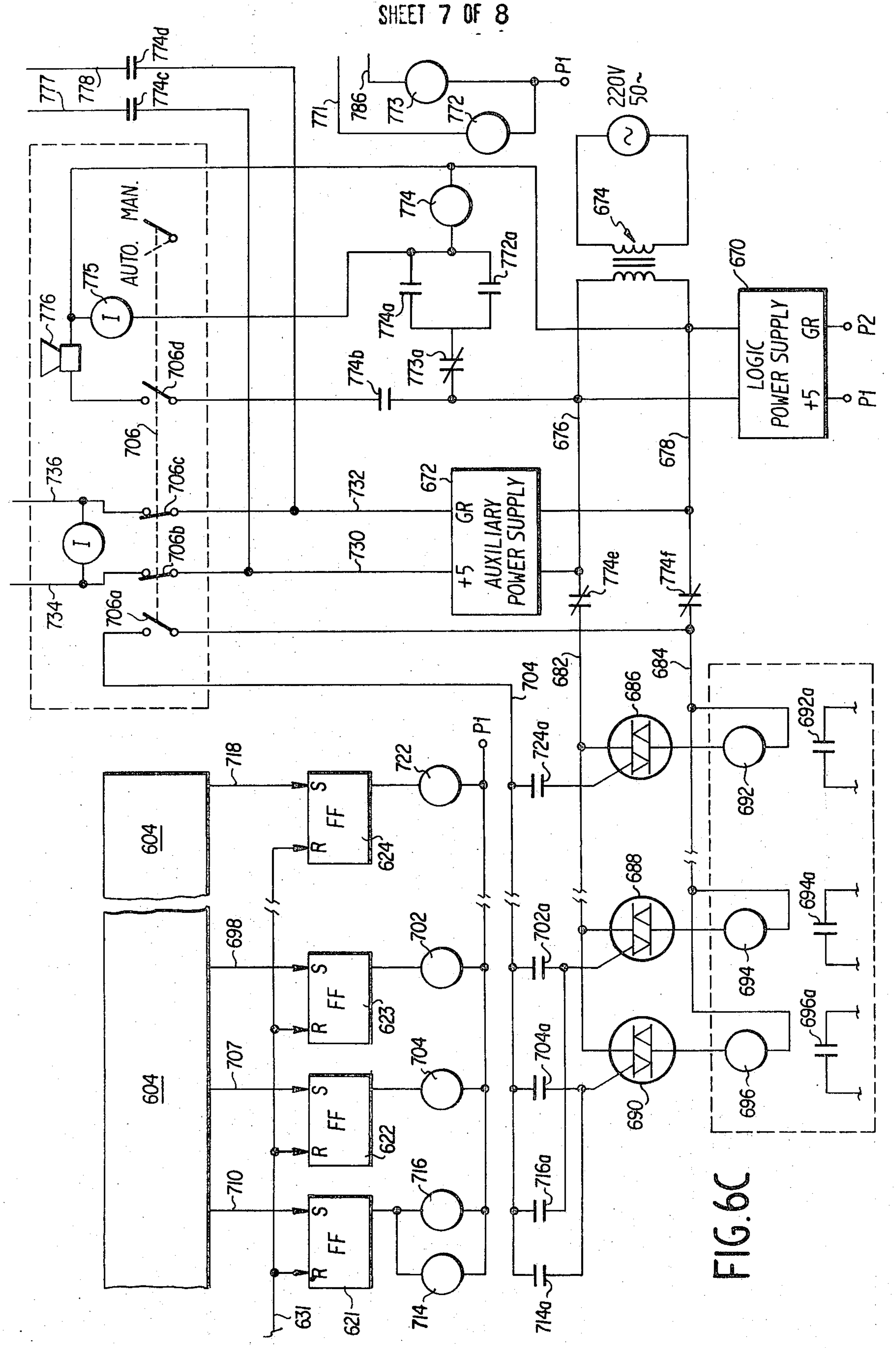

All of the multiplexers are identical and the circuits for a typical multiplexer are shown in FIGS. 6*a*–6*c*. Referring to FIG. 6*a*, the leads of the function bus 424*e* are connected to five differential receivers 601 which respond to the combination of voltage levels on the leads to produce the five binary function signals F1–F5. The signal F5 is inverted by an inverter 602 to produce the function signal $\overline{F5}$. The function signals F1–F4 are applied to a first function decoder 603 (FIG. 6*b*) and to a second function decoder 604, a portion of which is shown in FIG. 6*b* and a portion of which is shown in FIG. 6*c*. The decoders are both 4-to-16 bit decoders and the function signals F1–F4 serve to energize the decoders to select one of the 16 possible outputs from each of the decoders. The function signal F5 is applied to the decoder 604 whereas the function signal $\overline{F5}$ is applied to the function decoder 603. Thus, if the function signal F5 is present, the signals F1–F4 may energize decoder 604 whereas if the signal $\overline{F5}$ is present the signals may energize the decoder 603. However, since the function signals appearing on the function bus 424*e* are applied simultaneously to all of the multiplexers on the pot line it is necessary to limit the function decoding operation to only those functions intended for the particular multiplexer addressed. This is accomplished as follows.

In FIG. 6*a*, the signals on the address bus 424*a* are applied to five differential receivers 605 which have their outputs connected to input terminals of a manual plug board 606. Two NAND gates 607 and 608 have multiple inputs that are also connected to output terminals of the plug board 606. The output of NAND 608 is connected by way of a lead 609 to one input of NAND 607 so as to form an extended NAND gate, as is well known in the art. Manually inserted plug wires 610 are used to selectively connect the outputs of the differential receivers 605 to the inputs of NAND 607 and NAND 608. Each multiplexer on the pot line is assigned a different address and the plug wiring 610 is such that when the combination of address signals on address bus 424*a* corresponds to the address of the multiplexer a low level output signal is produced at the output of NAND 607. The output of NAND 607 is connected through an inverter 611 and over leads 612 and 613 to the gates 614 and 615 (FIG. 6*b*). Thus, when the multiplexer is addressed one of the function decoders 603 or 604 may be energized to produce an output signal on one of its 16 output leads. If the function signal F5 is present then the decoder 604 will produce an output signal on one of its 16 output leads, the particular output lead energized being determined by the combination of signals F1–F4. On the other hand, if the signal $\overline{F5}$ is present then the decoder 603 will produce an output signal on one of its 16 output leads, the particular output lead energized being determined by the combination of signals F1–F4.

Each output from the decoders 603 and 604 controls one of a series of flip-flops (FF) 616–624 and each flip-flop controls a function. A further function flip-flop 625 is provided to control the connection of the various anode stem voltages to the data bus 416 or the ground detector bus 418.

All of the flip-flops are reset at the time certain commands are to be performed by the multiplexer. The commands will contain an Enable bit which appears on bus 424*b*. This bit conditions a differential receiver 626 (FIG. 6*a*) which produces a low level output signal. This signal is inverted by an inverter 627 and applied to one input of a NAND gate 628. The address applied to differential receivers 605 causes the output of NAND 607 to go to a low level. The output of NAND 607 is inverted at 611 to condition the second input of NAND gate 628. The gate produces a low level output signal that is inverted by inverter 629 before being applied to a NOR circuit 630. The NOR circuit produces a low level output signal when any input is at a high level. The low level output of NOR 603 is applied over a lead 631 to the reset inputs of the function control flip-flops 616–625 (FIGS. 6*b* and 6*c*). Immediately thereafter, one of the decoders produces an output signal, as previously described, to set one of the flip-flops 616–624.

The various functions performed by a multiplexer in response to various commands will now be explained.

Read Stem Voltage

This command causes the multiplexer to connect the voltage sensing leads 38 and 40 (FIG. 1) for one anode stem to the data bus 416 so that the voltage may be sensed by the data processor. The command includes the address of the multiplexer, the function code, and the Enable bit is a binary 1. The function code identifies the particular anode of the addressed cell that is to have its anode stem voltage drop read onto the data bus. Thus, the function code may represent any number between one and eighteen, assuming the cell has 18 anodes 11. The address and Enable bits reset the function flip-flops 616–625 and energize the decoder 603 or 604 as previously described. Assume that the function is 00001 so that decoder 603 produces an output signal on lead 632. This signal sets the function flip-flop 616. Two solid state relays 634 and 636, having normally open contacts 634*a* and 636*a*, respectively, are connected to the output of FF616. The output of the flip-flop energizes the relays 634 and 636 to close the contacts 634*a* and 636*a*. The contacts 634 *a* and 636*a* have one side connected to the leads 38, and 40, respectively, which are attached to the anode stem of the anode block $11_1$ shown in FIG. 1. Thus, when the flip-flop 616 is energized the voltage at this anode stem is applied through the contacts 634a and 636a to a pair of leads 638 and 640.

From the leads 638 and 640 the measured stem voltage is applied to the data bus 416 through a pair of contacts 650a and 650b. These contacts are closed at this time because FF625 is reset. The high level output signal on output lead 641 from the flip-flop is applied to one input of a NAND gate 642 (FIG. *6a*). When the multiplexer is addressed and NAND gate 607 produces a low level output signal, this signal is inverted by inverter 611 and conditions the second input of NAND gate 642. Thus, when FF625 is reset the gate 642 produces a low level output signal that is inverted by an inverter 644 and applied over a lead 646 to FIG. *6b* where it energizes a solid state relay 648. The relay has a single set of normally open contacts 648*a* connected in series across the power supply with a mercury relay 650. The mercury relay 650 has two sets of normally open contacts 650*a* and 650*b* which connect the leads 638 and 640 to the data bus 416. The stem voltage drop at the anode stem $11_1$ is thus applied to the data bus from whence it may pass through the section box to the data processor. When the address on bus 424*a* is terminated, the output of NAND 642 goes to the high level. This releases relay 648 (FIG. 6B) which in turn releases relay 650 and its associated contacts 650*a* and 650*b*. When these contacts are opened the stem voltage is disconnected from data bus 416. However, the function flip-flop 616 remains energized and will be reset only when the multiplexer is again addressed with a command that includes the enable bit.

The commands for reading the stem voltage drops at stems 2 through 18 differ from the command for reading the stem voltage drop at stem 1 only in the function code. Thus, if the function code were 00010 the voltage drop at stem 2 would be connected to the data bus, etc. — and if the function code were 18 then the voltage drop at stem 18 would be connected to the data bus. Referring to FIG. *6b*, this requires 18 function flip-flops like FF616, each flip-flop controlling two solid state relays corresponding to 634 and 636, the relays having contacts corresponding to contacts 634*a* and 636*a*. Sixteen of the flip-flops are controlled by decoder 603 but only the one flip-flop 616 is shown in the drawing. Two of the flip-flops are controlled by decoder 604 and only one of these, i.e., FF617 is shown.

Determine Status

This command comprises an address and a binary one bit on the ground detection enable bus 424c. No function code, or enable bit is required. However, the command must be preceded by a command Read Stem Voltage which reads the stem voltage drop at the anode whose grounded/ungrounded status is to be determined. The Read Stem Voltage command leaves the function flip-flop, such as FF616 for stem 1, set so that the stem voltage drop appears across leads 638 and 640. Subsequently, the Determine Status command energizes the differential receiver 652 (FIG. *6b*) and the output of the receiver is applied over a lead 654 to set FF625. At this time the low level output signal from the flip-flop energizes solid state relay 655 and the relay closes its contacts 655*a*.

The contacts 655*a* are connected in series with a mercury relay 656 having two sets of normally open contacts 656*a* and 656*b*. When contacts 655*a* are closed relay 656 is energized to thus close contacts 656*a* and 656*b*. This connects the stem voltage for the selected anode, now appearing on leads 638 and 640, to the leads 201 and 202 of the ground detector bus 418. The voltage is applied to the ground detector 408 in the section box serving the multiplexer. As previously explained, the ground detector is enabled by the ground detector enable bit on bus 424c so that its counters are reset and their input gates opened to receive the two sequences of pulses that are derived from the stem voltage.

The Determine Status command includes an address only to reset a flip-flop 750 (FIG. *6a*) for reasons that will later be explained.

To summarize, it takes three different commands to provide an indication to the computer of the grounded or ungrounded status of an anode. A comand Read Stem Voltage sets a function relay to connect the stem voltage for the selected anode to leads 638 and 640. A command Determine Status conditions the ground detector 408 to conduct a 30 second measurement, and connects the stem voltage on leads 638 and 640 to the ground detector bus. Finally, after the measurement has been completed, a command Read Ground Detector reads out onto the data bus 416 from the ground detector 408 a binary bit indicating whether the anode is grounded or undergrounded.

Read Cell Voltage

The purpose of this command is to read the voltage drop between the anode bus 12 and the cathode bus 23 (FIG. 1), and apply the voltage over data bus 416 and bus 420 to the data processor. The command contains the address of the multiplexer associated with the cell whose voltage is to be determined, a function code identifying the operation to be performed, and an enable bit.

The enable bit and the address reset the function flip-flops 616–625, and the function code with the address energizes the decoder 604 in the manner previously described. The decoder produces an output signal to set FF620. The output of FF620 energizes two solid state relays 658 and 659 having contacts 658*a* and 659*a* associated therewith. When FF620 is set the contacts 658*a* and 659*a* close.

The contacts 658*a* and 659*a* are connected on one side to the leads 638 and 640. On the other side, the contacts are connected by leads 42 and 44 to the anode bus 12 and the cathode bus 23. When the contacts 658*a* and 659*a* close, the voltage drop across the cell appears on leads 638 and 640. Ground detector bus FF625 is reset so the contacts 650*a* and 650*b* are closed, as described above. Thus, the voltage drop across the cell is applied to the data bus 416 from whence it passes through the section box to the data processor.

Break Crust

During the reduction process it is necessary to break the crust which forms on the surface of a cell so that more alumina may be added to the cell. In a typical cell, motor driven means may be provided to break the crust at one, the other, or both ends of the cell. Thus, there are three commands to control crust breaking, the commands differing only in their function codes. Each command includes the address, the function code, and an enable bit, which operate as described above to reset all of the function flip-flops 616–625, energize the decoder, and set one of the function flip-flops. Specifically, if the command is Break Crust End 1 FF623 (FIG. 6C) is set. If the command is Break Crust End 2 FF622 is set, and if the command is Break Crust Both Ends FF621 is set.

Referring now to FIG. *6c*, there is shown the logic power supply 670 for the multiplexer, and an auxiliary power supply 672. Both power supplies are connected to a source of power through a transformer 674. The transformer output leads 676 and 678 are connected through a pair of normally closed contacts **774*e* and 774*f* to a pair of leads 682 and 684. A plurality of Triacs 686, 688 and 690 are connected to the lead 682 and are further connected in series with one of a plurality of electro-mechanical relays 692, 694, and 696.** The relays are located in a relay panel remote from the multiplexer and each of the relays has a pair of normally open contacts which may be connected in parallel with manual switches. The relay contacts or the manual switches may energize motors to perform such functions as moving the anode bridge up or down, dumping ore at one end or the other of a cell, or breaking the crust near one, the other, or both ends of the cell.

The Triacs are controlled by the output of the function decoder 604. If the command to be performed by the muliplexer is Break Crust End 1, the function signals will cause the decoder 604 to produce an output signal on lead 698 to set FF623. The output of FF623 energizes a solid state relay 702. The relay 702 has a set of normally open contacts 702a connected between the gate electrode of Triac 688 and the lead 704. The lead 704 is connected to one side of a set of contacts **706*a* on an auto-manual control switch 706 which is located remote from the multiplexer. The other side of switch contacts 706*a* is connected to the lead 684. If the switch 706 is in the auto position, indicating that operations are under data processor control, the closing of switch contacts 702*a* causes Triac 688 to conduct thereby energizing relay 694. The relay contacts 694*a*** close to energize a motor (not shown) to break the crust at the designated end of the cell.

The function decoder 604 produces an output signal on a lead 707 to set FF622 if the command to be performed is Break Crust End 2. FF622 controls a solid state relay 704 having contacts 604a which in turn control Triac 690 to energize electro-mechanical relay 696 and close its contacts **696*a*.**

If the command to be performed is Break Crust Both Ends then the function decoder 604 produces an output signal on lead 710 to set FF621. This flip-flop has two solid state relays 714 and 716 connected to its output. Relay 714 has a set of contacts **714*a* connected in parallel with the contact 704*a* and the relay 716 has a set of normally open contacts 716*a* connected in parallel with the contacts 702*a*. Thus, when FF621 is energized both Triacs 688 and 690 are rendered conductive and both relays 694 and 696 are energized to close the contacts 694*a* and 696*a*.** This energizes the motors (not shown) for driving the crust breaking apparatus at both ends of the cell.

Once begun, the crust breaking commands continue until the function flip-flop 621, 622 or 623 is reset. The conditions for resetting the function flip-flops are discussed later.

Move Bridge Up

When the command to be performed is that of moving the anode bridge up, the function decoder 604 produces an output signal on lead 718 to set FF624. The output from this flip-flop energizes a solid state relay 722 having a set of normally open contacts **724*a* connected in the gating circuit of Triac 686. When the Triac conducts it energizes electro-mechanical relay 692 thereby closing the contacts 692*a* in a circuit which will supply the voltage for driving a bridge jack motor. This voltage may be applied to the bridge jack 19 (FIG. 1) over the leads 20 and 22** to move the anode bridge upwardly.

To avoid further repetition, the circuits responsive to the commands for moving the anode bridge down, or dumping alumina into one end or the other of the cell are not shown. Each of these circuits is energized by an output lead from the decoder 604 and includes a flip-flop like 624, a solid state relay like 722, a Triac like 686, and an electro-mechanical relay like 692.

Switch Status

This command is provided to enable the data processor to determine whether the switch 706 is in the auto or the manual position. Output leads 730 and 732 of the auxiliary power supply 672 are connected through switch contacts 706b and 706c to a pair of leads 734 and 736. These leads extend into FIG. *6b* where they are connected through normally open contacts **742*a* and 744*a* to the leads 638 and 640. When the data processor wishes to determine the status of switch 706 associated with the multiplexer, it applies the Switch Status command including an address, a function code, and an enable bit, to the multiplexer. The function flip-flops are reset as for commands previously described, and then the decoder 706 produces an output signal on lead 738 to set FF618. The output of this flip-flop energizes two solid state relays 742 and 744 for closing the contacts 742*a* and 744*a*. If the switch 706 is set for Automatic control then switch contacts 706*b* and 706*c* are closed and the output voltage of the auxiliary power supply 672 is applied to the leads 638 and 640 through contacts 742*a* and 744*a*, from whence it passes through contacts 650*a* and 650*b* (closed because FF625 is reset) to the data bus 416 and eventually to the data processor. On the other hand, if switch 706 is in the manual position contacts 706*b* and 706 *c* are open and no voltage is applied across the leads 638 and 640** from the power supply. This condition is transmitted to the data processor over the data bus to signiify that the switch is in the manual position.

RESET AND ERROR CONTROL

Each multiplexer is provided with circuits for detecting various abnormal conditions resulting from cell upset, circuit failures, or programming errors. Upon detecting any of these conditions the multiplexer generates an interrupt signal that is transmitted to the data processor. Upon receipt of the interrupt signal the data processor may enter a diagnostic routine to discover what the abnormal condition is and, depending upon the condition, possibly emit commands to the multiplexer to correct the condition.

The circuits for producing the interrupt signal are shown in FIG. 6a and include a flip-flop 750. This flip-flop is connected to the output of NAND gate 607 by a lead 751 so that FF750 changes state each time the multiplexer is addressed. That is, one addressing of the multiplexer sets FF750 and the next addressing resets FF750. One output of FF750 is connected to a NAND 752 and the other output is connected to a timer circuit 753 which has its output connected as a second input to NAND 752.

Normally, FF750 is in a state such that one output blocks NAND 752. When the multiplexer is addressed a first time, the address causes the output of NAND 607 to go to a low level thus changing the state of FF750. The signal on lead 754 conditions one input of NAND 752 and the signal on lead 755 triggers the time 753. After some predetermined interval, say 45 seconds, the output of timer 753 conditions the second input of NAND 752 if FF750 has not changed state as a result of a second address causing the output of NAND 607 to go low a second time.

Normally, the programming of the data processor should be such that the multiplexer is addressed a second time within 45 seconds after it is addressed a first time. The reason for this is that the first address may be associated with a command such as Move Bridge Up. As explained above, this causes circuits to energize a motor to move the anode bridge upwardly. If this command is not cancelled then the anode bridge might be moved upwardly to such an extent that one or more anodes might be withdrawn from the electrolyte. Since the anodes carry currents in the range of several tens of thousands of amperes, the open-circuiting of the cell in this manner would obviously be undesirable.

Assuming that the second addressing of the multiplexer does not occur within 45 seconds of the first addressing, an interrupt signal is generated. After 45 seconds the output of timer 753 conditions NAND 752 and, since FF750 has been triggered only once it further conditions NAND gate 752. The gate produces an output signal that is inverted at 756, inverted again by a NOR circuit 757, and applied to a single shot multivibrator 758.

When multivibrator 758 receives a signal at its input, it triggers a timer 759 and applies a signal to a tri-state logic circuit which includes NOR circuits 760 and 761, inverter 762, and an AND gate 763. The tri-state logic circuit may be of a type such as the model DM8831 which is commercially available from the National Semiconductor Co. The tri-state logic circuit produces across the two leads in interrupt control bus 424f a voltage differential representing an interrupt signal. This signal exists until the timer 759 times out, and is applied over bus 424f, through the section box, to the data processor.

The purpose of timer 759 is to prevent the tri-state logic circuit from emitting several interrupt signals in a short interval of time as a result of a single abnormal condition triggering multivibrator 758 several times. This might occur as a result of pot voltage fluctuations which might trigger the multivibrator several times when an upset condition occurs in the cell, as described later. When the multivibrator 758 is triggered it turns on timer 759. The output of timer 759, acting through NOR 760 maintains a high impedance at the output of the tri-state logic circuit for a fixed interval of time after the multivibrator is first triggered. Thus, even though the multivibrator may be triggered by an output signal from NOR 756, then time out and return to its initial condition, and then in a very short interval be triggered again, the tri-state circuit will produce only one interrupt signal. At the time the multivibrator is triggered the second time, the tri-state logic circuit is being inhibited by the timer circuit 759 so a second interrupt signal is not produced.

When an interrupt signal is generated because FF750 is not reset within a given interval after it is set, the function flip-flops 616-625 are reset and an alarm is sounded to call the operator's attention to the cell. The output signal from NAND 752 is inverted at 756 and applied over lead 770 to NOR 630. The resulting output signal from NOR 630 is applied over lead 631 to FIGS. 6*b* and 6*c* where it resets the function flip-flops 616–625.

The output of inverter 756 is also applied over a lead 771 to FIG. 6*c* where it energizes a solid state relay 772. Relay 772 has a set of normally open contacts 772*a* connected in series with a set of normally closed contacts 773*a* and a solid state relay 774. The series circuit is directly connected across the output of transformer 674 so when contacts 772*a* close, relay 774 is energized.

Relay 774 has a set of normally open contacts 774*a* connected in parallel with contacts 772*a*. Contacts 774*a* close to provide a holding circuit for holding relay 774*a* energized after relay 772 returns to the deenergized state. An indicator lamp 775 is connected in parallel with relay 774, and as long as the relay is energized the lamp is on to visually indicate to an operator that an interrupt condition exists as a result of failure to cancel a commanded function, or, stated differently, failure to reset FF750 within the required time.

Relay 774 controls normally closed contacts 774*e* and 774*f* so that when the relay is energized the contacts open. This removes power from the triacs so that any function being controlled by the Triacs is immediately terminated.

Relay 774 has a set of normally open contacts 774*b* connected in series with manual switch contacts 706*d* and a speaker, bell, or other audible alarm 776. The series circuit is connected across the output of transformer 674 so when relay 774 is energized the alarm 776 is sounded if switch 706 is in the auto position.

Relay 774 has two further sets of normally open contacts 774*c* and 774*d* connected between the output leads 730 and 732 of the auxiliary power supply 672 and two further leads 777 and 778.

To digress for a moment, a multiplexer may send an interrupt signal to the data processor as a result of failure to reset FF750 within the required time, as described above, or as a result of an over-voltage across the cell, as subsequently described. Failure to reset EF750 causes relay 774 to be energized as just described whereas the over-voltage condition causes an interrupt signal without energizing relay 774. The course of action to be taken by the data processor is determined by what caused the interrupt, so means must be provided to enable the data processor to determine the cause. This is done by the data processor by issuing a command called Determine Failure which checks the status of relay 774.

The Determine Failure command includes an address, a function code, and an enable bit. These signals function to reset function control flip-flops 616–625 as previously described, and then enable decoder 604 (FIG. 6*b*) to set FF619. This flip-flop controls two solid state relays 779 and 780 having normally open contacts 779*a* and 780*a*. When FF619 is set, the contacts close thus connecting leads 777 and 778 to leads 638 and 640. Since FF625 is reset, contacts 650*a* and 650*b* are closed so that the Determine Failure command places on data bus 416 the voltage appearing across leads 777 and 778. In FIG. 6*c*, if relay 774 is energized the contacts 774*c* and 774*d* apply the output of the auxiliary power supply 672 to the leads 777 and 778. On the other hand, if the interrupt is the result of an over-voltage condition relay 774 will not be energized so there will be no voltage across leads 777 and 778. Thus, the data processor will receive over the data bus either a voltage differential indicating the interrupt was caused by failure to reset FF750, or no voltage differential indicating the interrupt was caused by an over-voltage across the cell.

It should be noted that when the data processor receives an interrupt signal it cannot, from that signal alone, determine which of the cells on the pot line generated the interrupt. Thus, when an interrupt signal is received by the data processor it must generate one Determine Failure command for each cell on the pot line. These commands will differ from each other only in the address portion so that the multiplexers on the pot line are addressed in turn. By the response signal it receives over data bus 416, the data processor is able to identify which, if any, of the multiplexers generated an interrupt signal as a result of failure to reset a FF750. If, after addressing each multiplexer, the data processor received no signal on data bus 416 as a result of a relay 774 being energized, this is an indication that the interrupt was a result of an over-voltage across a cell. The data processor may then be programmed to execute a sequence of Read Cell Voltage commands to locate the cell which caused the interrupt.

If the data processor determines that the interrupt signal is a result of the failure to reset a FF750, it generates the command Failure Reset. This command comprises a single binary bit on the bus 424*d* and is applied to all the multiplexers for the pot line. In FIG. 6*a*, the Failure Reset command is applied to a differential receiver 781. The output of the differential receiver is applied over a lead 782 to reset FF750. The output of the differential receiver is inverted by an inverter 783 and applied over a lead 784 to NOR 630. The output of NOR 630 is applied to FIGS. 6*b* and 6*c* when it resets the function flip-flops 616–625.

The output of inverter 783 is inverted by an inverter 785 and applied over a lead 786 to FIG. 6*c* where it energizes a solid state relay 773. This relay controls normally closed contacts 773*a* so when the relay is energized the contacts 773*a* open. This opens the circuit to relay 774 and lamp 775. Relay 774 drops out so its contacts transfer. This shuts off the audible alarm 766, disconnects the auxiliary power supply 672 from the leads 777 and 778 and reapplies power to the Triacs. As soon as the Failure Reset command is terminated, relay 773 returns to normal. The circuit is now cleared of its error-indicating condition.

As previously stated, the voltage drop across the cell is continuously monitored and an interrupt signal produced if the voltage drop becomes excessive. An abnormally high voltage drop generally indicates an "upset" condition in the cell that requires correction.

In FIG. 1, the voltage drop across the cell is available on leads 42 and 44 connected to the anode bus 12 and the cathode bus 23. The lead 42 (FIG. 6B) is connected to the parallel combination of a Zener diode 765 and a solid state relay 766. Lead 44 is connected through a resistor 767 and a Zener diode 768 to the other side of diode 765 and relay 766. As long as the voltage drop across the cell is within normal limits, say 4.5V, diode 768 does not conduct and relay 766 is not energized. However, if the voltage drop across the cell should increase above normal limits for any of the reasons well known in the art, the breakdown voltage of diode 768 will be exceeded and the diode will conduct, thus energizing relay 766. The relay closes its contacts 766*a* so that a signal is applied over lead 790 to NOR 757 (FIG. 6*a*). The output of NOR 757 triggers multivibrator 758 to generate an interrupt signal on bus 424 as previously described. The diode 765 is connected in parallel with solid state relay 766 to protect the relay by limiting the voltage applied to the relay to the breakdown voltage of the diode.

While a preferred embodiment of the invention has been described in specific detail, it should be understood that various modifications and substitutions may be made therein without departing from the spirit and scope of the invention as defined by the appended claims.

The embodiments of the invention in which an exclusive property or privilege is claimed are defined as follows:

1. A system for controlling a plurality of alumina reduction cells each including a plurality of anodes, said system including:

data processor means for issuing address codes and function codes;

a plurality of sensor means for sensing the stem voltages of the anodes in each of said cells, there being one group of sensor means for each of said cells;

ground detector means;

a ground detector bus connected to said ground detector means; and a plurality of addressable multiplexers, one for each cell, said multiplexers each including means responsive to address and function codes from said data processor for selectively connecting one of said sensor means in one of said groups to said ground detector bus.

2. A system as claimed in claim 1 and further comprising a data bus connected in parallel with said ground detector means and said ground detector bus; and, means responsive to a signal from said data processor for selectively directing the sensed stem voltage to said ground detector bus or said data bus.

3. A system as claimed in claim 1 wherein said ground detector means includes means responsive to an enabling signal from said data processor for determining the grounded or ungrounded condition of the anode whose stem voltage is connected thereto, and means for storing an indication of said connection.

4. A system as claimed in claim 3 and further comprising:

means responsive to an address from said data processor for transferring said stored indication to said data processor.

5. A system as claimed in claim 2 wherein said ground detector means includes means responsive to an enabling signal from said data processor for determining the grounded or ungrounded condition of the anode whose stem voltage is connected thereto, and means for storing an indication of said condition.

6. A system as claimed in claim 5 and further comprising switching means responsive to a further address and an enabling signal from said data processor for selectively applying to said data processor the stem voltage on said data bus or the stored indication in said grounded detector means.

7. A system for controlling a plurality of alumina reduction cells, said system including:

a data processor;

a plurality of addressable multiplexers, each cell being associated with one of said multiplexers;

an address and function bus connected to said data processor and connected in parallel to each of said multiplexers for applying address codes and function codes to said multiplexers;

each said multiplexer including:

function decoding means for receiving any function code on said address and function bus;

address decoding means responsive to a unique address code assigned to the multiplexer for enabling said function decoding means; and, control means responsive to said decoding means for executing the function designated by said function code at a cell associated with the multiplexer designated by said address code.

8. A system as claimed in claim 7 and further comprising:

an anode bridge means and crust breaking means responsive to said control means.

9. A system as claimed in claim 7 and further comprising:

sensing means at each cell for sensing cell and anode stem voltages; and, a data bus connected to said data processor and said multiplexers, said control means responding to said function codes to selectively apply one of said voltages to said data bus.

10. A system as claimed in claim 7 wherein each said multiplexer includes means for generating an error signal if the multiplexer is not addressed a second time within a predetermined interval after it is addressed a first time.

11. A system as claimed in claim 10 and including means connected in parallel to all said multiplexers for applying any generated error signal to said data processor.

12. A system as claimed in claim 9 and further comprising:

a section box;

ground detector bus connected to said ground detector means, and in parallel to each said multiplexer;

said control means being responsive to said function code and a control signal from said data processor for connecting to said ground detector bus the anode stem voltage sensing means designated by said function code;

said section box including means responsive to said control signal for activating said ground detector means.

13. A system as claimed in claim 12 wherein said section box includes switching means responsive to a unique address on said address and function bus for selectively applying to said data processor the stored indication in said ground detector means.

14. A system as claimed in claim 9 wherein each said multiplexer includes means for generating an error signal when the sensed cell voltage exceeds a predetermined limit.

* * * * *